May 4, 1926.
C. C. FREDERICK ET AL
1,583,450
SANITARY BUCKET WASHER
Filed July 13, 1925
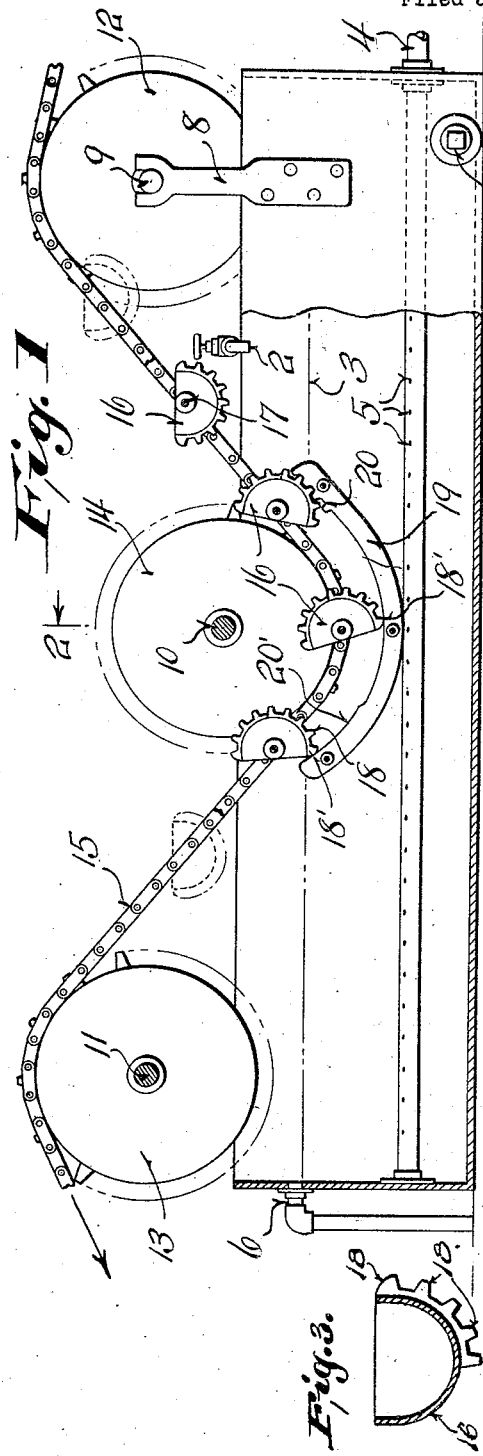
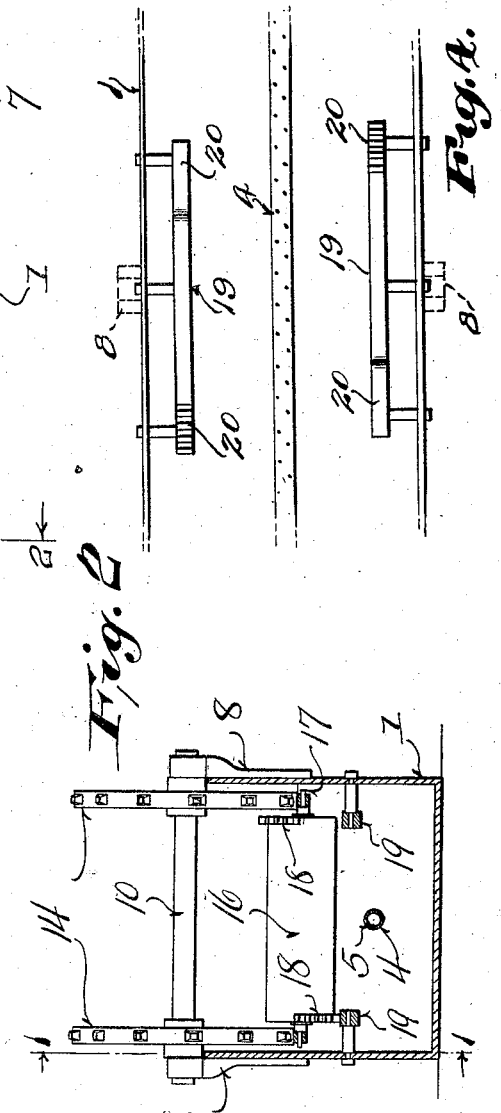
Inventors!
Carl C. Frederick
Wallace W. Evans
By Young & Young
Attorneys!

Patented May 4, 1926.

1,583,450

UNITED STATES PATENT OFFICE.

CARL C. FREDERICK AND WALLACE W. EVANS, OF FALL RIVER, WISCONSIN.

SANITARY BUCKET WASHER.

Application filed July 13, 1925. Serial No. 43,307.

*To all whom it may concern:*

Be it known that we, CARL C. FREDERICK and WALLACE W. EVANS, both citizens of the United States, and residents of Fall River, in the county of Columbia and State of Wisconsin, have invented certain new and useful Improvements in Sanitary Bucket Washers; and we do hereby declare that the following is a full, clear, and exact description thereof.

This invention relates to bucket washing mechanism.

In pea canneries and similar works, the keeping of the buckets of the conveyors in a sanitary condition is a serious problem which frequently necessitates loss of time or else a sacrifice of sanitary conditions.

This invention is designed to overcome the above noted defects, and objects of such invention are to provide mechanism for thoroughly washing the buckets while the conveyor is in motion, and to so organize the mechanism that it will clean and sterilize the buckets in a very rapid and simple manner.

An embodiment of the invention is shown in the accompanying drawings, in which:

Figure 1 is a side elevation partly in section, of the washing mechanism, such view corresponding to a section on the line 1—1 of Figure 2.

Figure 2 is a transverse sectional view on the line 2—2 of Figure 1.

Figure 3 is a mid sectional view through one of the buckets.

Figure 4 is a plan view of a portion of the tank with the chains, buckets and sprocket wheels removed to show the construction of the lower mechanism.

Referring to the drawings, it will be seen that the device comprises an elongated tank 1, preferably of rectangular construction. This tank is filled with the washing liquid in any suitable manner, as by means of the spigot 2. Preferably the liquid level is maintained at approximately the line indicated by reference character 3. The steam pipe 4 projects into the tank and is provided with a plurality of apertures 5 through which jets of steam may be projected into the water to maintain it at the desired temperature, preferably at a sterilizing temperature. The water level is maintained in any suitable manner, as by means of the overflow 6. A drain plug 7 is positioned adjacent the lower portion of the tank.

A plurality of pairs of sprocket wheels are supported in any convenient manner, as for instance by means of supports, such as indicated at 8, in Figures 1 and 2, which extend upwardly from the tank and receive the transverse shafts 9, 10 and 11 of the pairs of sprocket wheels. The sprocket wheels 12 and 13 are positioned above the tank for their major portion, and the sprocket wheels 14 are positioned between the sprocket wheels 12 and 13 and extend downwardly into the liquid in the tank.

The conveyor, such as commonly used in pea canneries, may consist of a pair of chains 15 which pass over the sprocket wheels and through the other mechanism in the usual manner. These chains pivotally support a plurality of buckets 16 which are free to rock about their trunnions 17. These buckets are provided on opposite sides with segmental gears, such as indicated at 18. It is to be noted that the last gear is preferably slightly enlarged, as indicated at 18' in Figures 1 and 3.

Combined rack and cam members 19 are secured to the inner sides of the tank and preferably these members are positioned on opposite sides of the center pair of sprocket wheels 14. They are provided at their forward ends, considering the direction of rotation of the conveyor, with rack teeth 20 which engage the teeth 18 and rock the buckets into a position such as to have their inner surfaces thoroughly washed in passing through the liquid in the tank. These members 19 are provided at their outer ends with cam surfaces 20' which engage the enlarged final teeth 18', as shown clearly in Figure 1, and further tilt the buckets to insure adequately draining thereof as they leave the liquid. Thereafter the buckets assume their usual position and continue to the canning machinery.

It will be seen that a very simple washing mechanism has been provided, which is absolutely effective in operation, which will quickly and thoroughly wash and sterilize the buckets without interrupting the operation of the conveyor.

It will be seen further that the device requires no attention after it has once been started in operation and that it may be left in operation as long as desired.

It will be seen further that the apparatus has a very small number of parts and is adapted to operate irrespective of the direction of travel of the conveyor. In other words, the members 19 on opposite sides of the tank are reversed. That is, the rack teeth 20, as shown in Figure 1, are on the righthand side of the member 19 facing Figure 1. On the other side, the rack teeth and cam members are reversed as may be seen from Figure 4. Similarly it is noted particularly from reference to Figures 2 and 3 that the buckets 16 are provided with rack teeth extending through approximately 90° and that these rack teeth are mounted on opposite sides of the longitudinal axis of the bucket. In this manner reverse direction of the conveyor is permitted so that the machine may be installed in any desired position with respect to the travel of the conveyor.

Although the invention has been described in considerable detail, it is to be understood that it may be variously embodied and is therefore to be limited only as claimed.

We claim:—

1. In a machine of the class described, the combination of a tank for a washing liquid, a conveyor consisting of spaced chains, guiding means for passing said conveyor into and out of said tank, a plurality of buckets pivotally suspended between said chains, teeth carried by said buckets adjacent one end thereof, a curved member positioned within said tank and having rack teeth at one end adapted to engage teeth on said buckets, and having a cam member at its other end adapted to tilt said buckets when they are leaving said member, whereby said buckets are washed inside and out during their passage through the tank, and whereby said buckets are drained of all liquid by the tilting action of the said cam member.

2. In a machine of the class described the combination of a tank for containing a washing liquid, a conveyor comprising a pair of spaced chains, semicircular buckets pivotally mounted between said chains and each having gear teeth on its outer side, a guiding revoluble member for guiding said conveyor into said tank, a combined cam member and rack having an arcuate shape concentric with the axis of said revoluble member, said combined cam and rack member having rack teeth at its forward end for rocking said buckets into a tilted position and having a curved cam member for holding said buckets in the tilted position and having a second cam member at its rear end for further tilting said buckets to insure proper draining.

In testimony that we claim the foregoing we have hereunto set our hands at Fall River, in the county of Columbia and State of Wisconsin.

CARL C. FREDERICK.
WALLACE W. EVANS.